United States Patent [19]
Ponzio et al.

[11] Patent Number: 5,528,822
[45] Date of Patent: Jun. 25, 1996

[54] STATOR WINDING APPARATUS

[75] Inventors: Massimo Ponzio; Massimo Lombardi, both of Florence, Italy

[73] Assignee: AXIS USA, Inc., Marlborough, Mass.

[21] Appl. No.: 179,775

[22] Filed: Jan. 10, 1994

Related U.S. Application Data

[63] Continuation of Ser. No. 869,578, Apr. 5, 1992, abandoned.

[51] Int. Cl.⁶ .................................................. H02K 15/095
[52] U.S. Cl. .............................. 29/736; 29/596; 242/432; 242/432.6
[58] Field of Search ............................. 29/596, 732, 736; 242/1.1 R, 1.1 E

[56] References Cited

U.S. PATENT DOCUMENTS

| | | | |
|---|---|---|---|
| 3,027,475 | 3/1962 | Gaudry | 310/260 |
| 3,879,841 | 4/1975 | Mason | 29/596 |
| 4,631,814 | 12/1986 | Barrera | 29/736 |
| 4,991,782 | 2/1991 | Luciani | 59/596 X |

FOREIGN PATENT DOCUMENTS

| | | |
|---|---|---|
| 1586077 | 4/1969 | France . |
| 1257268 | 12/1967 | Germany . |
| 2327150 | 12/1973 | Germany . |
| 3328403 | 5/1983 | Germany . |
| 469390 | 4/1969 | Switzerland . |
| 1362141 | 7/1974 | United Kingdom . |

*Primary Examiner*—Carl E. Hall
*Attorney, Agent, or Firm*—Fish & Neave; Robert R. Jackson; G. Victor Treyz

[57] ABSTRACT

Electric motor stators can have coils wound on their poles which coils have more turns than the poles could normally support by augmenting the pole with additional structures to support the added coil turns. The additional structures can be only temporarily associated with the stator, e.g., by adding them to the winding shrouds which are customarily applied to the stator during winding. Alternatively these additional structures can be permanent but non-magnetic portion of the stator, e.g., by adding them to the terminal board members of the stator.

10 Claims, 11 Drawing Sheets

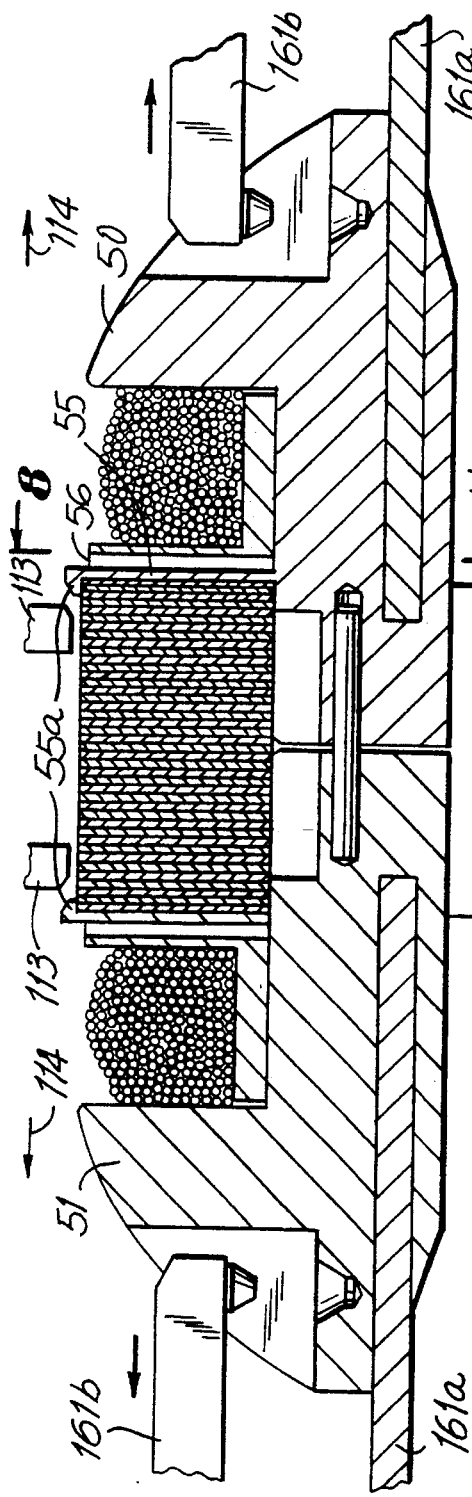
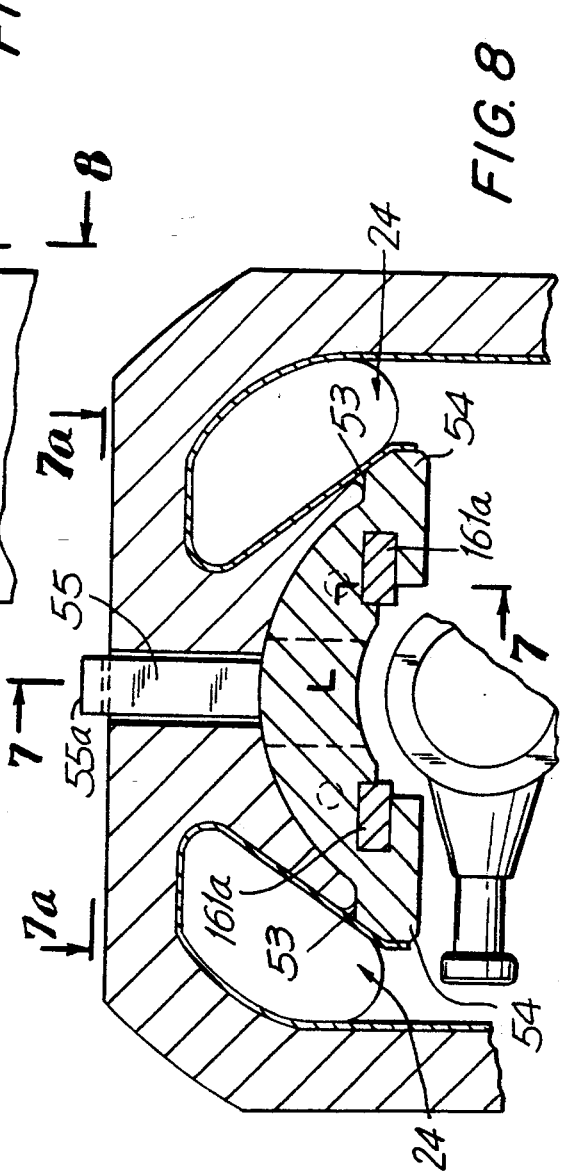

STATOR WINDING APPARATUS

This is a continuation of application Ser. No. 07/869,578, filed Apr. 15, 1992, entitled STATOR WINDING APPARATUS, now abandoned.

BACKGROUND OF THE INVENTION

This invention relates to methods and apparatus for winding stators such as electric motor stators.

Some modern electric motors require the largest possible coils to be wound on the poles of the stator. On the other hand, increasing the width of the poles to support the extra coil turns as they are being applied may have a deleterious effect on the efficiency of the resulting motor.

To increase the number of coil turns without increasing the width of the stator poles it has been proposed to form the coils off the stator, to lace the coils so that their turns remain together, and to then mount each coil on a stator pole which is part of a separate portion of a stator. The separate stator portions are then welded together to make a finished stator. This solution to the problem of producing larger stator coils is difficult, cumbersome, and costly, and it would be much better to be able to wind the coils directly on a complete stator body as is typically done for stators having poles which can readily support all the turns of the coils as they are wound.

In view of the foregoing, it is an object of this invention to provide methods and apparatus for winding coils on stator poles having more turns than the pole itself can support during winding.

SUMMARY OF THE INVENTION

This and other objects of the invention are accomplished in accordance with the principles of the invention by providing structures which increase the size of the poles of a stator so that the poles can support an increased number of coil turns. These structures may either be temporarily added to the stator during coil winding and then removed from the stator after the coils have been wound and stabilized, or they may be a permanent part of the finished stator. In at least the latter case, the structures of this invention are non-magnetic so that they do not increase the magnetic size of the pole.

Further features of the invention, its nature and various advantages will be more apparent from the accompanying drawings and the following detailed description of the preferred embodiments.

BRIEF DESCRIPTION OF THE DRAWINGS

FIG. 7 is a view generally similar to FIG. 6 showing an alternative embodiment of the invention. FIG. 7 is taken generally along the line 7—7 in FIG. 8.

FIG. 8 is a view generally similar to FIG. 5 for the embodiment of FIGS. 7 and 7a. FIG. 8 is taken generally along the line 8—8 in FIG. 7 but additionally depicts a wire dispensing needle.

FIG. 9 is taken generally along the line 9—9 in FIG. 10, although the wire dispensing needle is omitted entirely from FIG. 9.

FIG. 10 is a view generally similar to FIG. 5 for the embodiment of FIGS. 9 and 9a.

FIG. 11 is taken generally along the line 11—11 in FIG. 12.

DETAILED DESCRIPTION OF THE PREFERRED EMBODIMENTS

Figure 1:
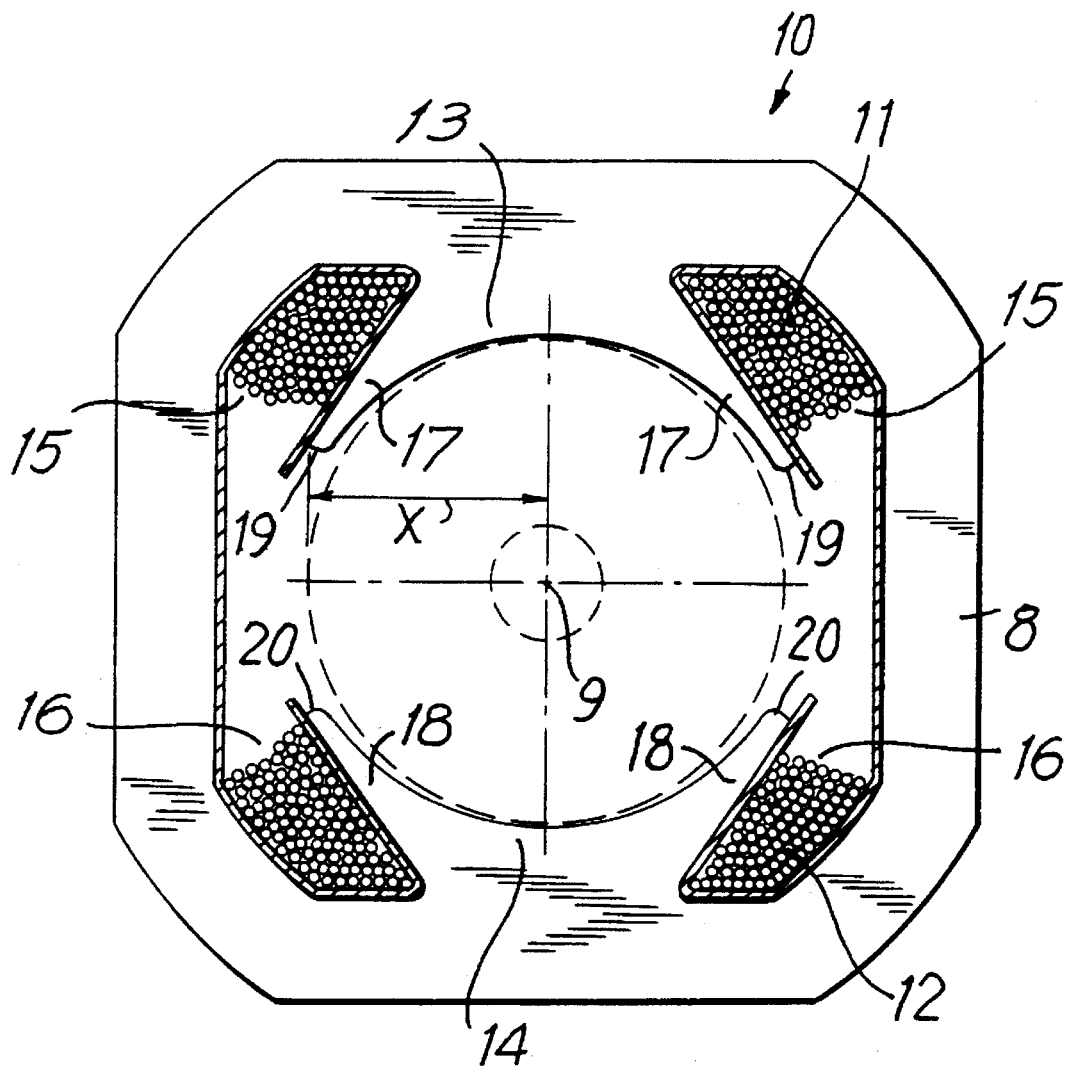
FIG. 1 is a simplified axial end view, partly in section, of an illustrative prior art two-pole electric motor stator.

A simplified axial end view of a typical prior art two-pole electric motor stator 10 is shown in FIG. 1. The generally preferred technique for winding the coils of wire 11 and 12 on the poles 13 and 14 of such stators is by dispensing the wire from a needle which alternately reciprocates and oscillates relative to the stator. The coils may be wound one after another, or both coils may be wound simultaneously (e.g., by a single needle with two wire dispensing outlets or by two needles operating together). The needle may either reciprocate along and oscillate about the central longitudinal axis 9 of stator core 8, as shown, for example, in Mason U.S. Pat. No. 3,879,841, or the needle may reciprocate along and oscillate about an axis which is laterally offset from axis 9 toward the pole on which the wire is currently being wound as shown, for example, in Luciani U.S. Pat. No. 4,991,782.

When the needle reciprocates along and oscillates about central longitudinal axis 9, winding forms (also sometimes referred to as shrouds or shoes) are typically required adjacent each axial end of each pole to ensure that the wire forming the axial ends of each coil is deposited radially far enough out so that it does not obstruct the hollow central opening of the stator. One of the advantages of using the laterally offset or "eccentric" needle technique shown in the above-mentioned Luciani patent is that it may eliminate the need for such winding forms. The present invention can be used either with concentric winding (e.g., as in the above-mentioned Mason patent) or eccentric winding (e.g., as in the above-mentioned Luciani patent).

As noted above, it is desired for some modern electric motors to have more coil turns (also known as "higher slot fill") for a given stator size. Because coil turns must be supported by the sides 17 and 18 of the stator poles in order to remain in place as they are wound, they cannot be located beyond the edges 19 and 20 of the poles. Accordingly, one way to increase the number of coil turns which can be placed on a stator is to widen the sides 17 and 18 of the stator poles, thereby increasing dimension X and allowing additional coil turns to be placed in regions 15 and 16. However, this has the disadvantage that it tends to reduce the efficiency of the magnetic field in the finished motor. Thus there are limits to the extent to which the sides of the stator pole can be widened.

Figure 2:
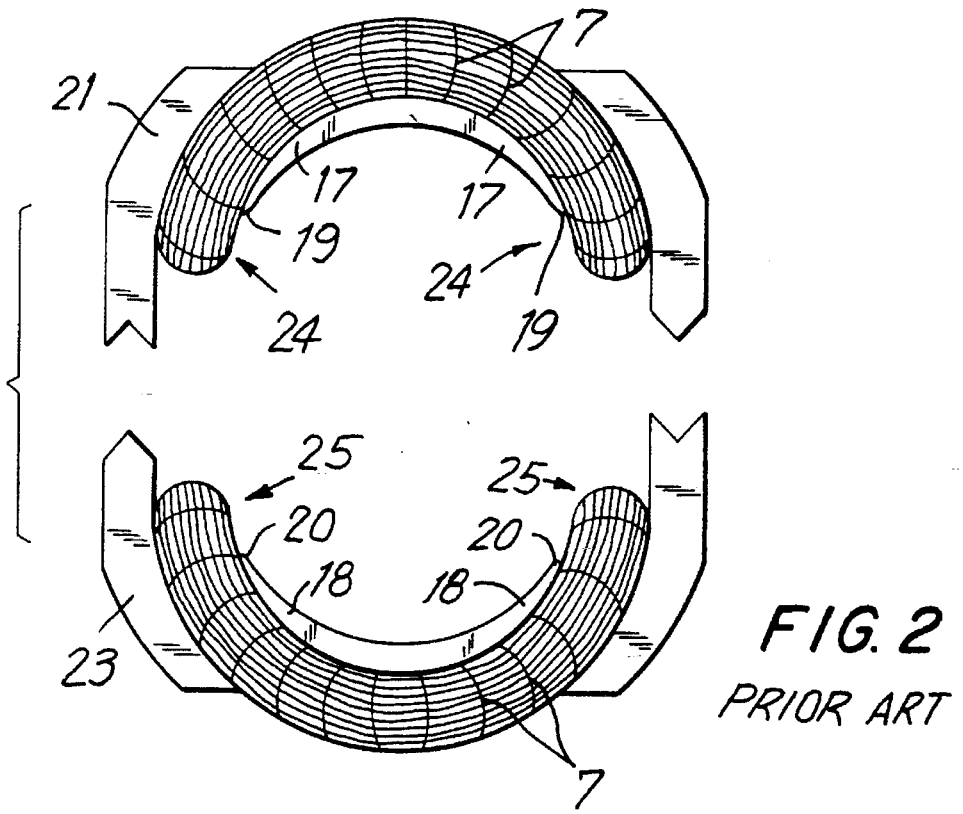
FIG. 2 is a simplified axial end view of two complementary portions of another illustrative prior art two-pole electric motor stator.
Figure 3:
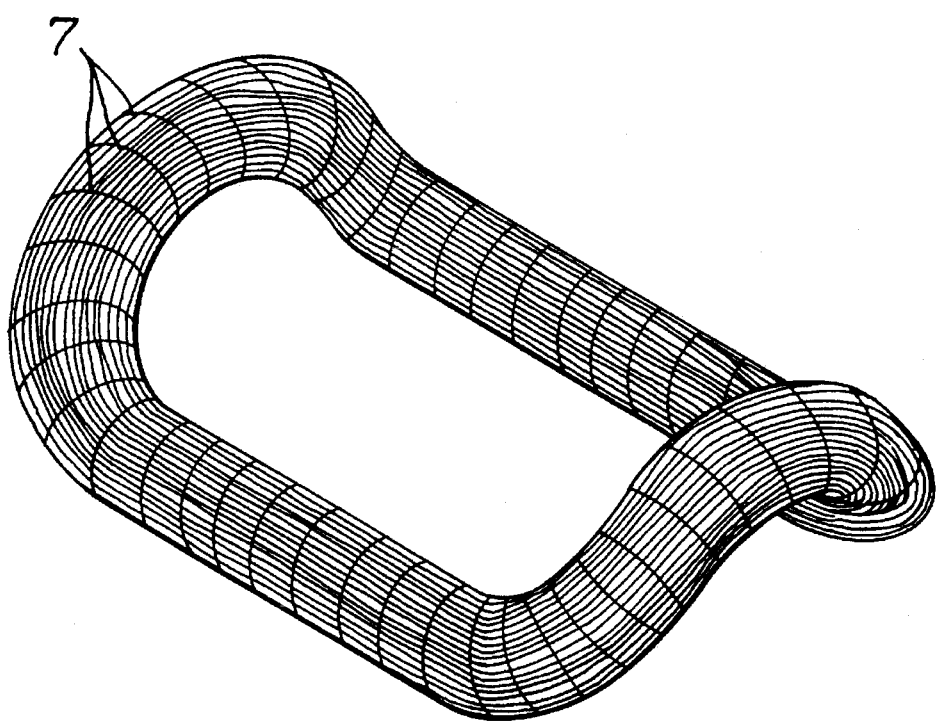
FIG. 3 is a simplified perspective view of one of the coils shown in FIG. 2 prior to association of that coil with the remainder of the apparatus shown in FIG. 2.

To avoid the magnetic inefficiency which results from widening the sides of the stator poles, it is known to form the desired coils off the stator as shown in FIG. 3 and to lace each coil as shown at reference number 7 to hold the turns of the coil together. Then the coil is placed on a pole on a half stator core 21 or 23 as shown in FIG. 2. Each coil is forced into the slots behind the sides 17 or 18 of the associated stator pole so that it remains secured to that pole with the added coil turns 24 and 25 supported by lacing 7. Other final shaping of the coil may be necessary after it has thus been placed on its pole. Then the two halves 21 and 23 of the stator core are brought together and welded to produce a finished stator as shown in FIG. 4.

Figure 4:
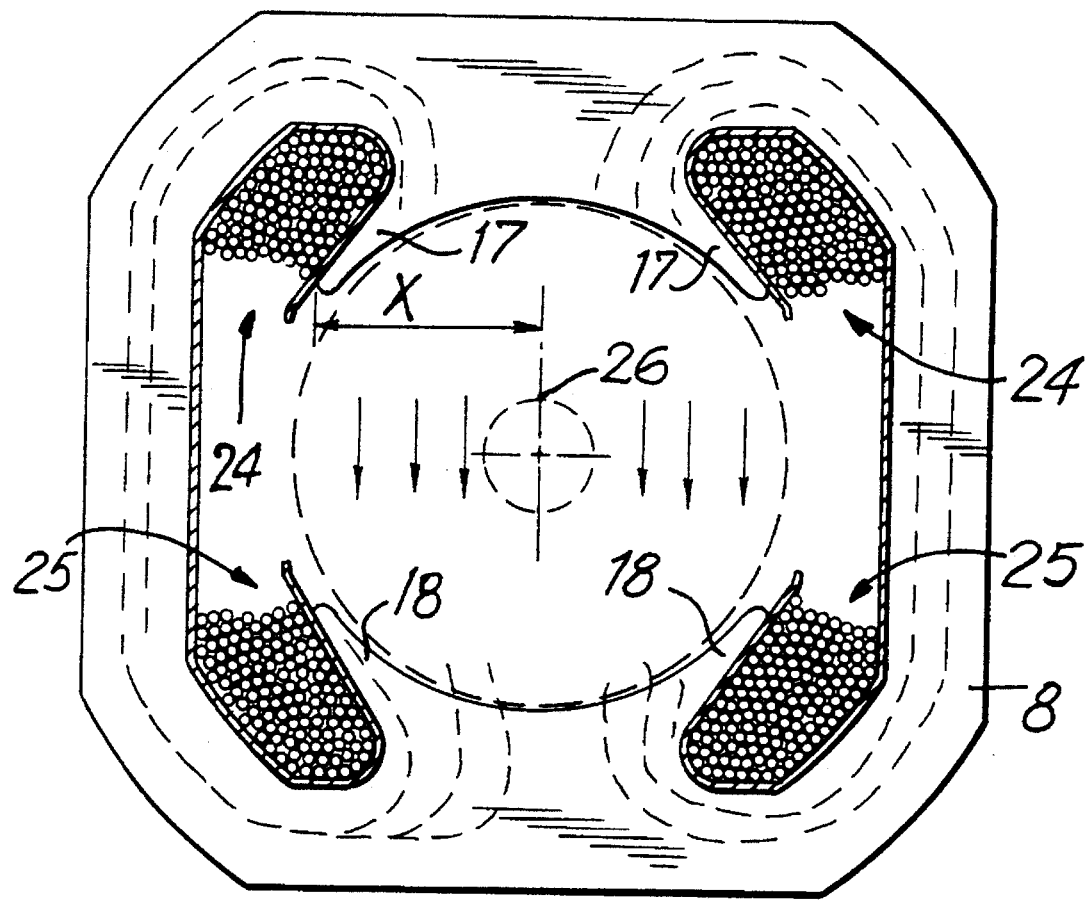
FIG. 4 is a simplified axial end view, partly in section, of the stator of FIG. 2, or alternatively a similar stator which can be produced in accordance with this invention.

Because the sides 17 and 18 of the stator poles shown in FIG. 4 are not as wide as they would have to be to support the turns of the coils if the coils were formed by being wound on the poles, the efficiency of the magnetic field (indicated by the arrows and broken lines in FIG. 4) is not adversely affected by increased pole width. The added coil turns 24 and 25 increase the strength of the magnetic field between the stator poles. Avoiding increasing the width of the poles (given by 2X) to support these extra turns helps to keep the magnetic field concentrated. The result of such a stronger but still concentrated magnetic field is increased motor power. However, it has heretofore been much more difficult and expensive to produce stators having the structure shown in FIG. 4. The prior art techniques for producing such stators also do not lend themselves to use with aluminum alloy coil wire. Press fitting previously formed coils of such wire into the stator slots tends to scrape the wire and cause undesirable contamination. This does not occur when such wire is wound directly on a stator pole from a wire dispensing needle.

The present invention allows stators to be made with exactly the structure shown in FIG. 4 by winding the coils directly on the stator poles and without the need for such steps as separate formation and lacing of the coils off the stator, placement of the coils on half stator cores, and welding together of such half stator cores to produce a finished stator. By providing an increased number of coil turns according to the principles of the invention, the power of the stator may be increased without enlarging the stator pole piece to accommodate the additional wire. Similarly, smaller motors may be provided without a loss of motor power, as with more turns the stator size can be reduced while maintaining the same stator strength. A first illustrative embodiment of the invention is shown in FIGS. 5 and 6 and will now be described.

Figure 5:
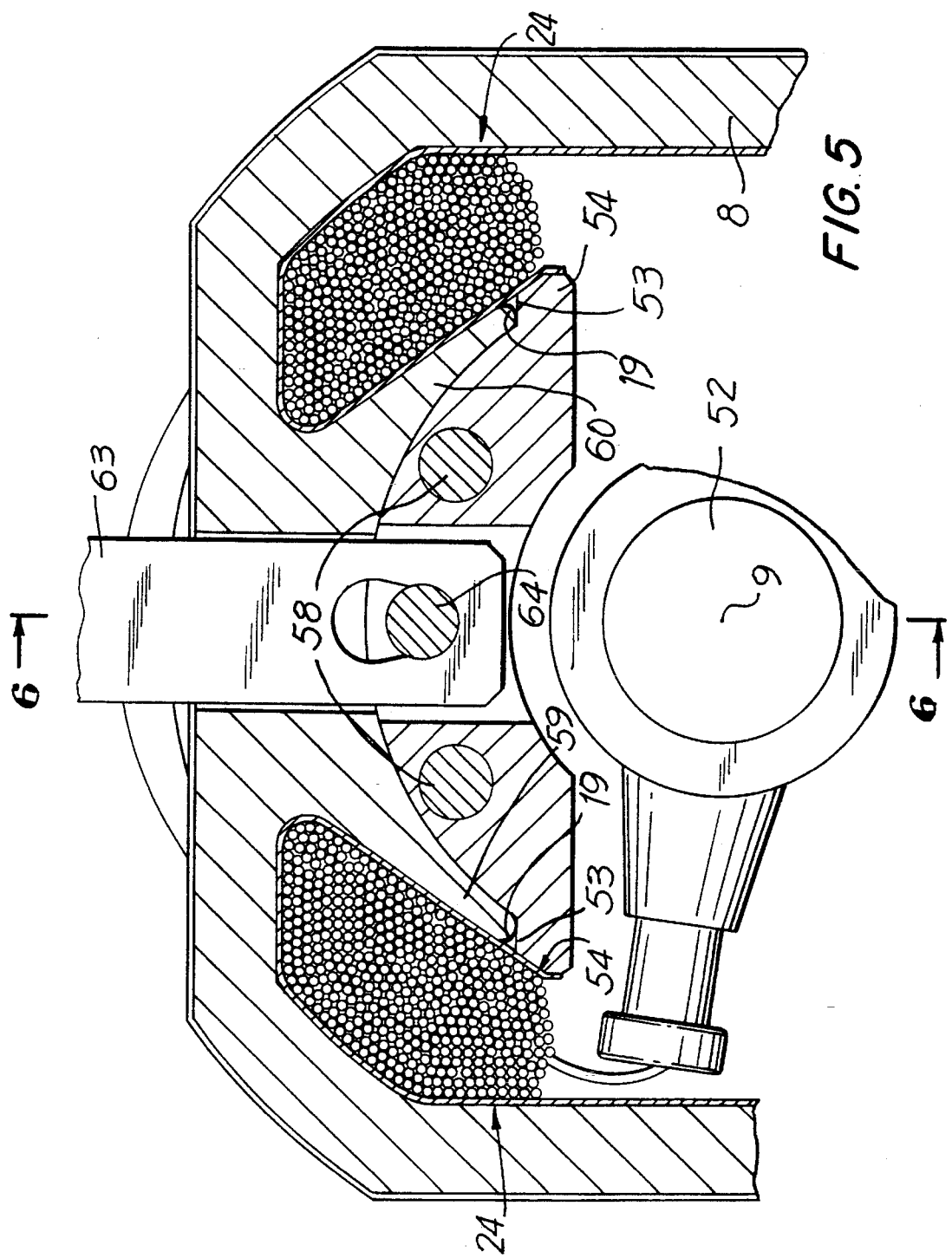
FIG. 5 is an elevational view, partly in section, of apparatus constructed in accordance with this invention for winding coils on stators. Portions of FIG. 5 are taken along the line 5—5 in FIG. 6.
Figure 6:
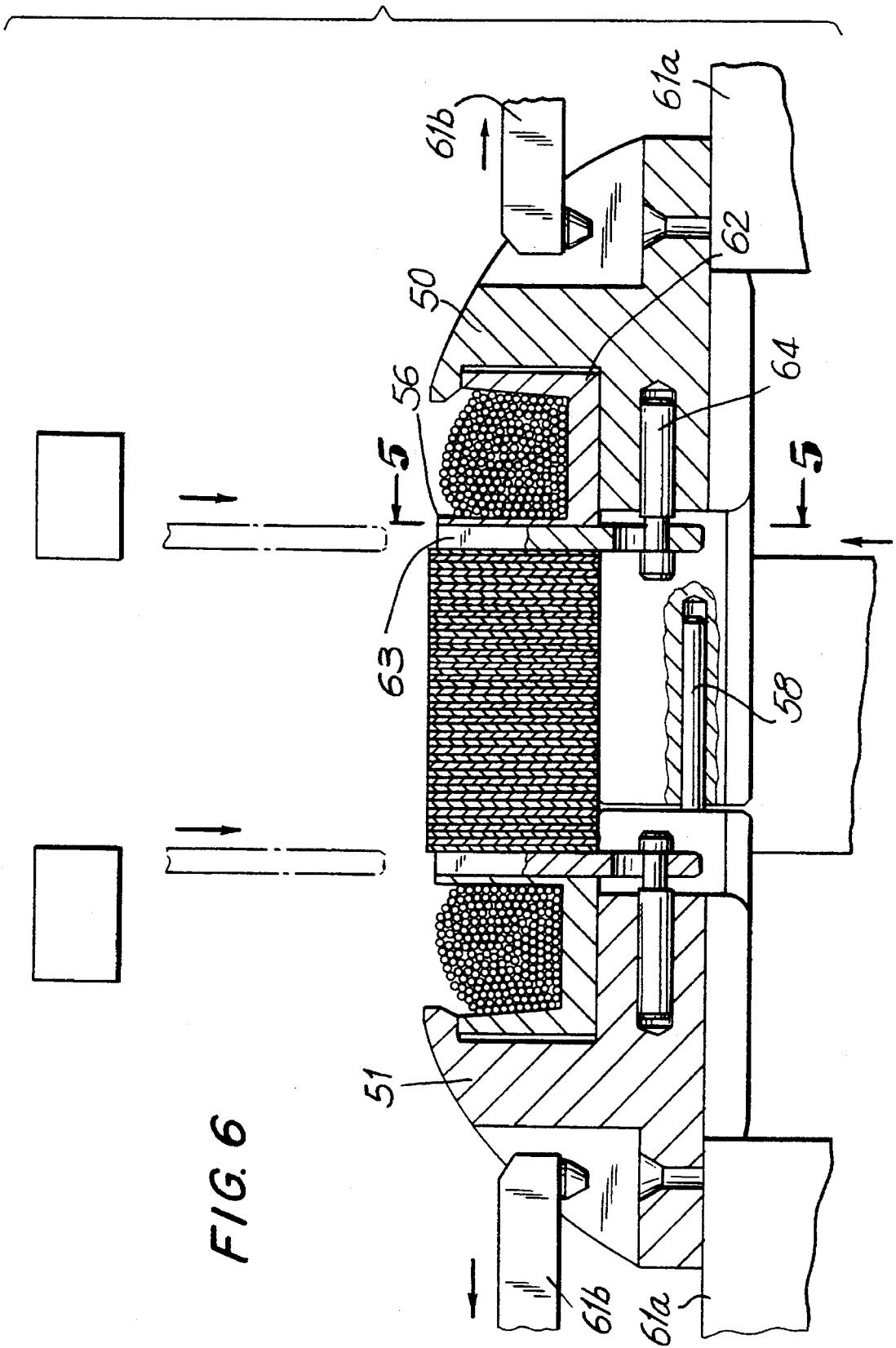
FIG. 6 is a sectional view taken generally along the line 6—6 in FIG. 5 but with the winding needle of FIG. 5 omitted and with elements for manipulating the winding shrouds added.

In the embodiment shown in FIGS. 5 and 6 the coils are wound on the stator poles by a needle 52 which alternately reciprocates along and oscillates about an axis 9 concentric with stator core 8. (Although only a portion of the stator core is shown in FIGS. 5 and 6, it will be understood that the coils are wound on a complete, annular stator core 8. Similarly, although only one wire dispensing outlet is shown on needle 52, it will be understood that the needle can have a separate, oppositely directed wire outlet for simultaneously winding a coil on the opposite pole of the stator if desired. Alternatively, the coils can be wound one after another with wire from the same single wire dispensing outlet.) In order to avoid having to increase the width of sides 59 and 60 of the stator pole, shrouds 50 and 51 (which are typically required in any event to wind a coil with a concentric needle) are augmented with additional structures at 54 which act as temporary extensions of the width of the associated stator pole (and wire holder 62) during winding of the coil. In particular, shrouds 50 and 51 are shaped at 53 to receive the side edges 19 of the sides of the associated stator pole. (The same relationship exists between added shroud structures 54 and the side edges of coilholders 62.) Added shroud structures 54 therefore support the added coil turns 24 which are not directly supported by the sides 59 and 60 of the stator pole.

Figure 16:
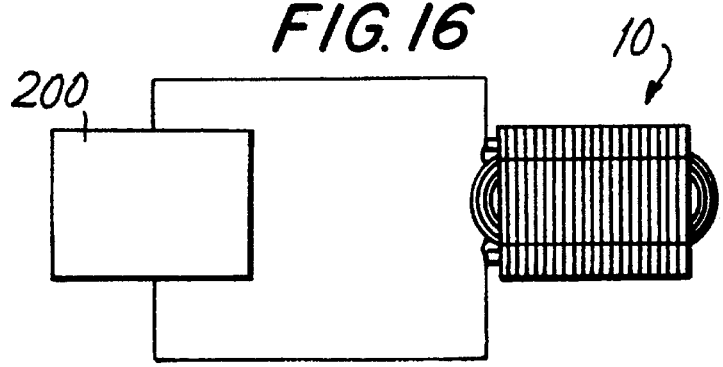
FIG. 16 is a simplified schematic block diagram of illustrative apparatus for fusing the turns of coils wound on a stator in accordance with the invention.

After the full coil has been wound, the turns of the coil are fused together by any of several possible techniques. For example, one such technique, illustrated by FIG. 16, is to pass through the finished coil an electrical current from current source 200 which is sufficient to heat the coil to the fusing temperature of fusable insulation used on the coil wire. This causes the insulation of adjacent turns to fuse together. Other possible techniques for similarly fusing the coil include impregnating the coil with an adhesive or temporarily exposing the coil to a volatile solvent for the wire insulation. In any event, the result of this coil fusing operation is that the added coil turns 24 become supported by other coil turns which are directly supported by the sides 59 and 60 of the stator pole. After both coils have thus been wound and fused, shrouds 50 and 51 can be removed from the stator.

Techniques for manipulating shrouds like shrouds 50 and 51 are well known in the art and need not be described in detail here (see, for example, Eminger et al. U.S. Pat. No. 4,732,338, Dryburgh U.S. Pat. No. 3,648,938, Moore U.S. Pat. No. Re. 25,281, Nussbaumer et al. U.S. Pat. No. 4,679,312 and Mason U.S. Pat. No. 3,903,593). Suffice it to say that shrouds 50 and 51 are applied to the opposite axial ends of the stator before the coils are wound. Each shroud may be brought up to the associated axial end of the stator by a movable carriage (not shown) which includes a support surface 61a and gripper 61b for releasably supporting and holding the shroud. The shroud may be pressed against the associated end of the stator, or it may be stopped at a predetermined location relative to the stator. As is typical, each shroud is recessed to admit a coilholder 62 which has been previously mounted on the adjacent end of the stator, generally as part of an annular terminal board 56 on the end of the stator. (Although elements 56 are referred to herein as terminal boards, they may or may not actually include terminals for the stator coil leads.) One of the shrouds (in this case shroud 51) has axially extending pins 58 which fit into axially extending sockets in the other shroud to help ensure proper alignment and secure mounting of the shrouds on the stator. Each shroud 50 and 51 also has an axially extending pin 64 which is releasably engaged by an associated latch 63 which extends into the side of the stator (through an aperture in adjacent terminal board 56) to releasably secure the shroud to the stator after the associated support surface 61a and gripper 61b have been removed. (Latches 63 may be generally similar to latch members 62 in the above-mentioned Moore patent; see also locking bars 71 and 72 in the above-mentioned Eminger et al. patent.) Thus the coils are wound with shrouds 50 and 51 held in place by latches 63 and with elements 61 removed and out of the way of the wire dispensing needle.

After the coils have been wound and their insulation fused as described above, shrouds 50 and 51 are removed from the stator. This is done by reengaging the shrouds with support surfaces 61a and grippers 61b. Latches 63 are then moved radially inwardly of the stator a short distance so that the enlarged head of each pin 64 can pass through the enlarged portion of the aperture in the associated latch 63. Elements 61 then pull the shrouds axially away from the ends of the stator, after which latches 63 can be withdrawn radially from the stator.

Figure 7A:
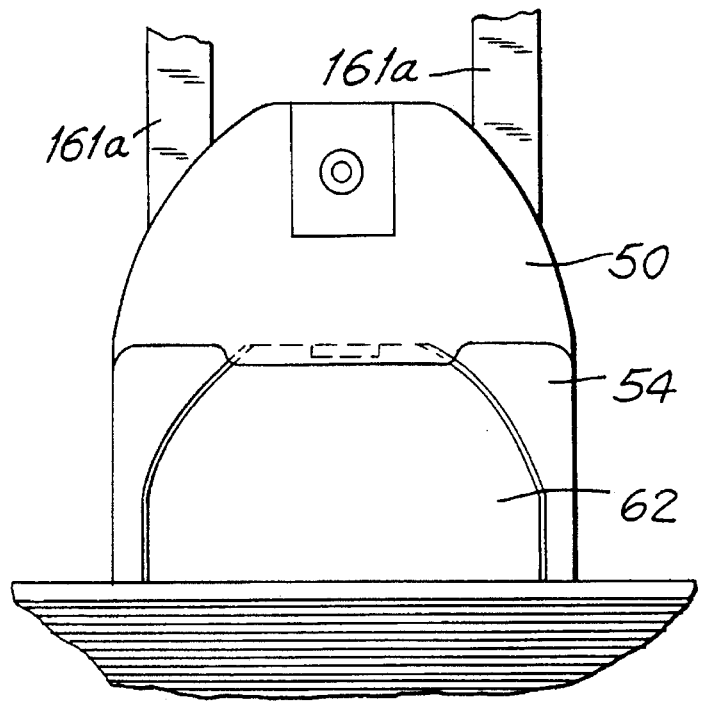
FIG. 7a is a partial plan view taken along the line 7a—7a in FIG. 8.

FIGS. 7, 7a, and 8 show another illustrative embodiment of the invention. This embodiment is similar to the first embodiment in the respect that once again shrouds 50 and 51 include structures 54 which temporarily extend the width of the associated stator pole to support additional coil turns 24 wound on the pole. The only significant differences between this embodiment and the first embodiment are in the ways the shrouds are applied and held to the stator.

In the embodiment shown in FIGS. 7, 7a, and 8 each shroud has a latching finger 55 which can be made to pass radially out through an aperture in the adjacent terminal board 56. The distal end of each finger 55 has an enlargement 55a which latches against the outer surface of the stator when the shroud is properly positioned on the stator. To mount the shrouds on the stator in this fashion, each shroud is supported on the tines 161a of a movable fork. The shrouds are moved into the axial ends of the stator on tines 161a along an axis which is radially offset from the final radial location of the shrouds when latched to the stator. Tines 161a then move the shrouds radially relative to the stator in the direction indicated by the arrow 61d in order to cause fingers 55 to enter the slots in the terminal boards and to cause latches 55a to latch on the outer surface of the stator. Tines 161a can then be withdrawn from the shrouds, leaving the shrouds latched to the stator by elements 55 and 55a.

After the coil has been wound and fused as described above in connection with the first embodiment, tines 161a are reinserted in shrouds 50 and 51. Latch release fingers 113 are positioned adjacent latches 55a and moved in the directions indicated by arrows 114 to release latches 55a from engagement with the stator. Tines 161a are then moved in the direction opposite the arrow 61d to withdraw fingers 55 from the apertures in terminal boards 56. The shrouds can then be axially pulled apart (preferably with the aid of grippers 161b) in order to remove the shrouds from the stator.

Figure 9A:
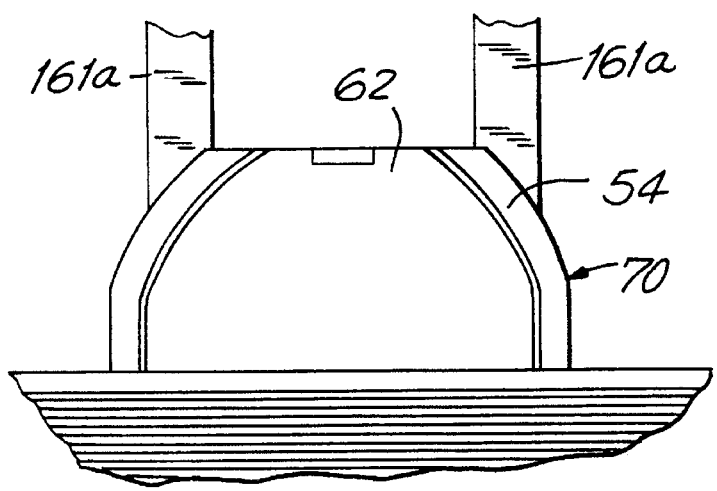
FIG. 9a is a partial plan view taken generally along the line 9a—9a in FIG. 10.
Figure 9:
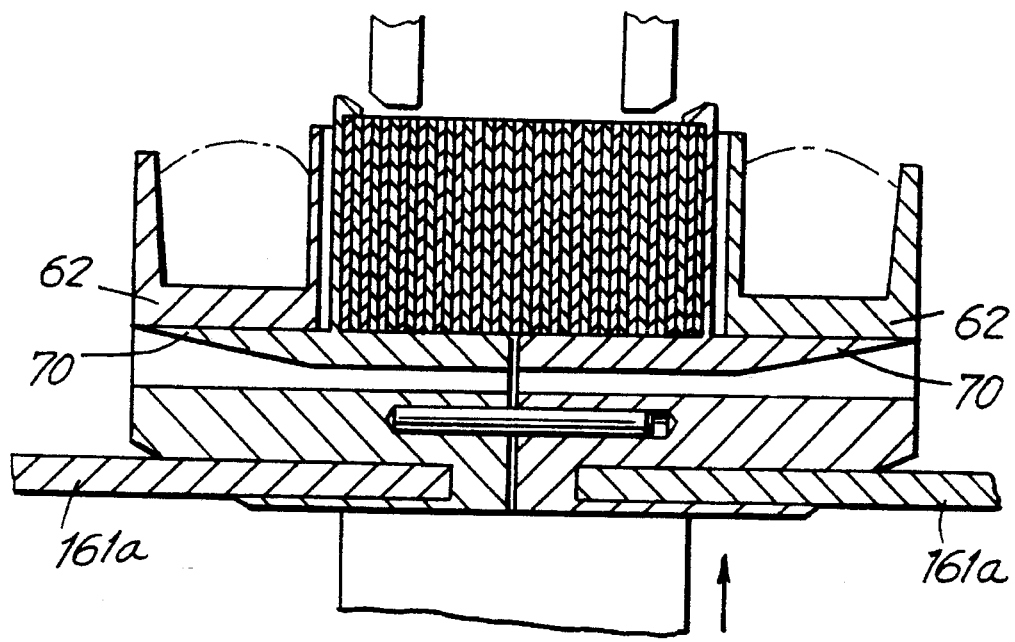
FIG. 9 is a view generally similar to FIG. 6 showing another alternative embodiment of the invention.
Figure 10:
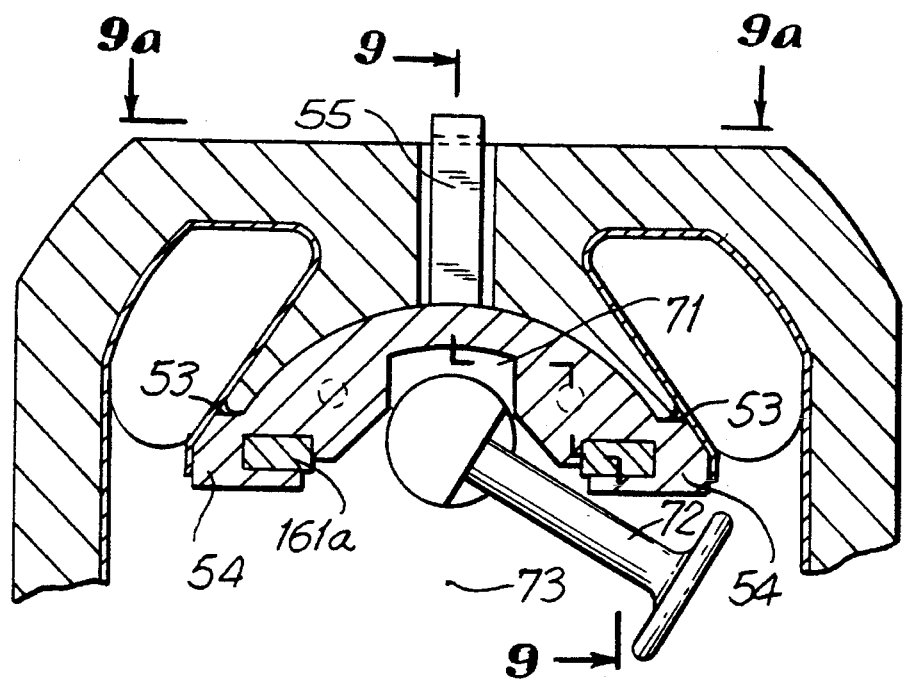

FIGS. 9, 9a, and 10 show a third illustrative embodiment of the invention which is adapted for eccentric winding as in the above-mentioned Luciani patent. Thus needle 72 in FIG. 10 is eccentric to the central longitudinal axis 73 of the stator. Shrouds are normally not needed during eccentric winding. However, members 70, which are somewhat like shrouds, are provided in accordance with this invention to support the added coil turns during winding and prior to fusing of the coil as described above. When in place on the stator, members 70 collectively extend between the oppositely facing axial ends of coilholders 62. Unlike the shrouds in the previously described embodiments, the use of eccentric needle 72 makes it unnecessary for members 70 to extend axially beyond the ends of the coilholders 62 in order to guide wire from the needle into the coilholders. The structures 54 on members 70 are needed, however, in accordance with this invention to act as temporary lateral extensions of the sides of the stator poles (and the sides of wire holders 62) as in the previously described embodiments to support the extra coil turns prior to fusing of the coils. Members 70 are recessed as shown at 71 to admit eccentric needle 72.

With the exception of the differences discussed above, members 70 may be similar to shrouds 50 and 51 in the above-described second embodiment. In particular, members 70 may be placed on, releasably latched to, and removed from the stator in generally the same way that shrouds 50 and 51 are manipulated in the second embodiment. Although grippers comparable to grippers 161b are not shown in the third embodiment, they can be added (e.g., below tines 161a) if needed to ensure reliable separation and withdrawal of members 70 after the coils have been wound and fused.

Figure 11:
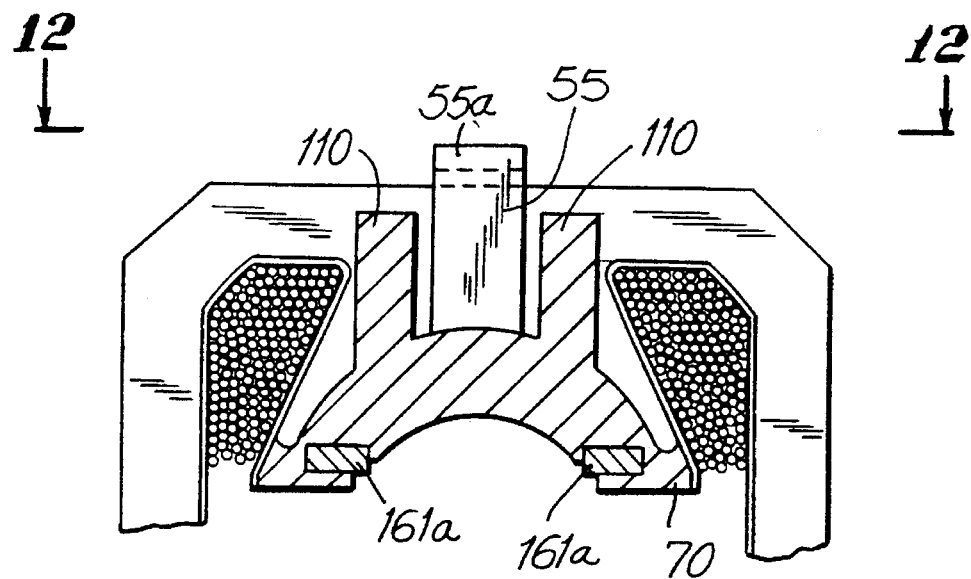
FIG. 11 is a view generally similar to FIG. 10 for yet another alternative embodiment of the invention.
Figure 12:
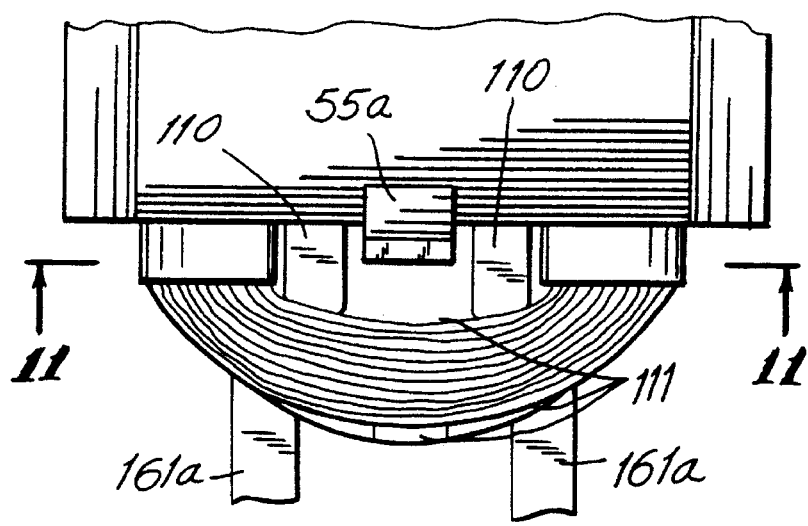
FIG. 12 is a partial plan view taken along the line 12—12 in FIG. 11.

Some stators do not require and are therefore not provided with permanent coilholders like coilholders 62 in the previously described embodiments. FIGS. 11 and 12 show a fourth embodiment of the invention which is adapted for use in winding coils on such stators with an eccentric needle as in the third embodiment. The members 70 employed in the fourth embodiment can be generally similar to the members 70 in the third embodiment with a few exceptions which will now be described.

In order to provide a passageway for withdrawal of finger 55 and its enlarged latch 55a after the coil has been wound and fused, members 70 are provided spacers 110 on both sides of finger 55 for spacing the adjacent end of the coil from the adjacent axial end of the stator. This leaves a passageway through which elements 55 and 55a (as well as spacers 110) can be withdrawn after the coils have been wound and fused. Member 70 may also include a temporary coilholder 111, which is similar to the coilholders 62 in the previously described embodiment, but which is removed from the finished stator with the remainder of the associated member 70.

Members 70 in FIGS. 11 and 12 may be mounted on, latched to, and later removed from stators in the same way that shrouds 50 and 51 in the second embodiment and members 70 in the third embodiment are manipulated as described above.

Figure 13:
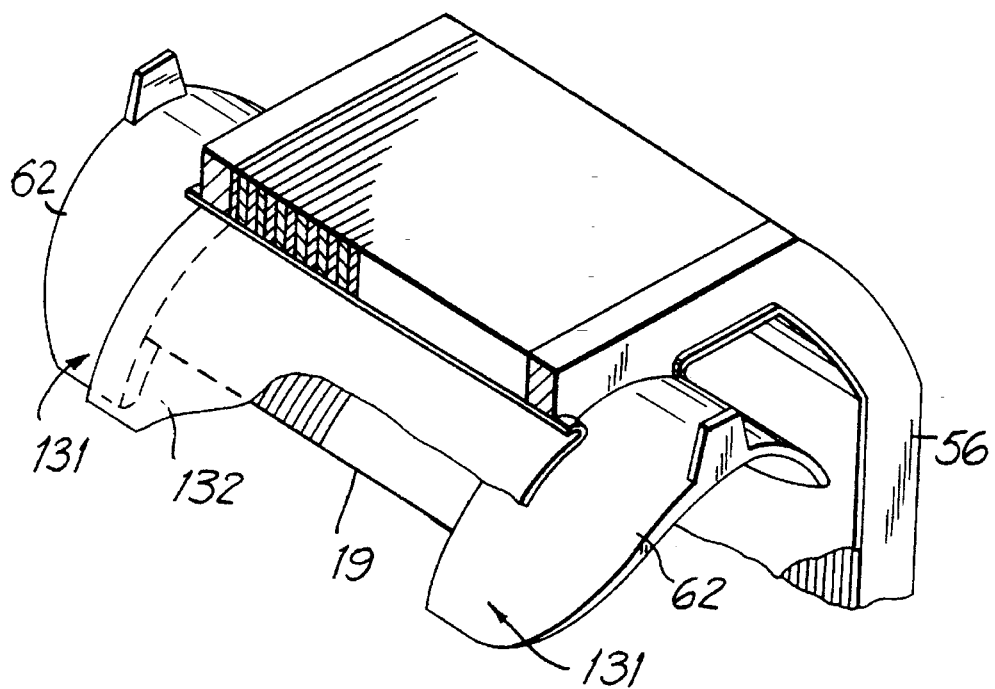
FIG. 13 is a partial perspective view, partly in section, showing still another alternative embodiment of the invention.
Figure 14:
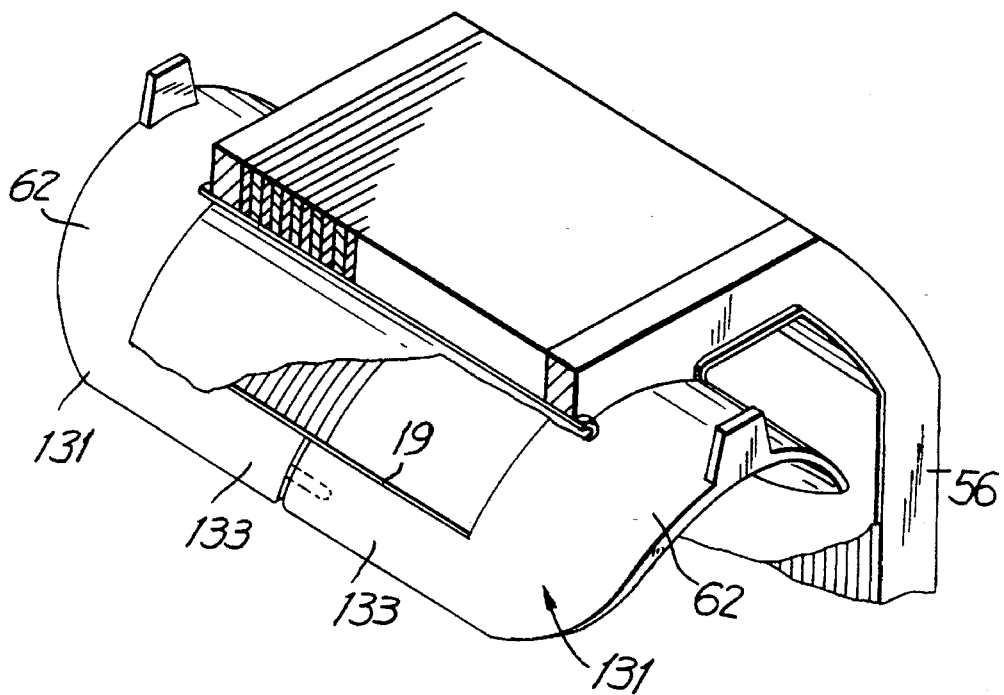
FIG. 14 is a view similar to FIG. 13 for yet another alternative embodiment of the invention.

In all of the embodiments discussed so far the structures which support the added coil turns are only temporarily associated with the stator during winding of the coils and prior to fusing of the coils. FIGS. 13 and 14 show illustrative embodiments of the invention in which the terminal board and coilholder elements of the stator are augmented with structures for performing this function. Accordingly, the winding shrouds (if required for other purposes) do not have to perform this function. Moreover, because the terminal board and coilholder elements are a permanent part of the stator, the extra coil turn support structures also become a permanent part of the stator. This may render the above-described coil fusing step unnecessary in these embodiments of the invention. The terminal board and coilholder elements (and therefore the extra coil turn support structures) are typically made of plastic or other insulating and non-magnetic material. Accordingly, although the extra coil turn support structures provide permanent mechanical support for the extra coil turns, they do not alter the magnetic size or extent of the associated stator poles. The terminal board and coilholder may be formed and mounted on the stator stack by injection molding.

In the embodiment shown in FIG. 13 each coilholder 62 includes a lateral extension 131 along each of its sides. These extensions widen the coilholder enough to support the desired number of added coil turns. The portions of these added turns which extend parallel to the longitudinal axis of the stator are self-supporting spans between axially aligned extensions 131. The customary slot lining insulation may be extended (e.g., at 132) to help ensure that these added coil turns are adequately insulated from the remainder of the finished motor.

In the alternative embodiment shown in FIG. 14 lateral extensions 131 also have axial extensions 133 which help to support the axially extending portions of the added coil turns which span between extensions 131. Axial extensions 133 may abut or nearly abut one another inside the stator, and may interfit where they are adjacent to one another (e.g., with a pin extending from one extension 133 into a socket in the other extension 133 as suggested by the dotted lines in FIG. 14.

Figure 15:
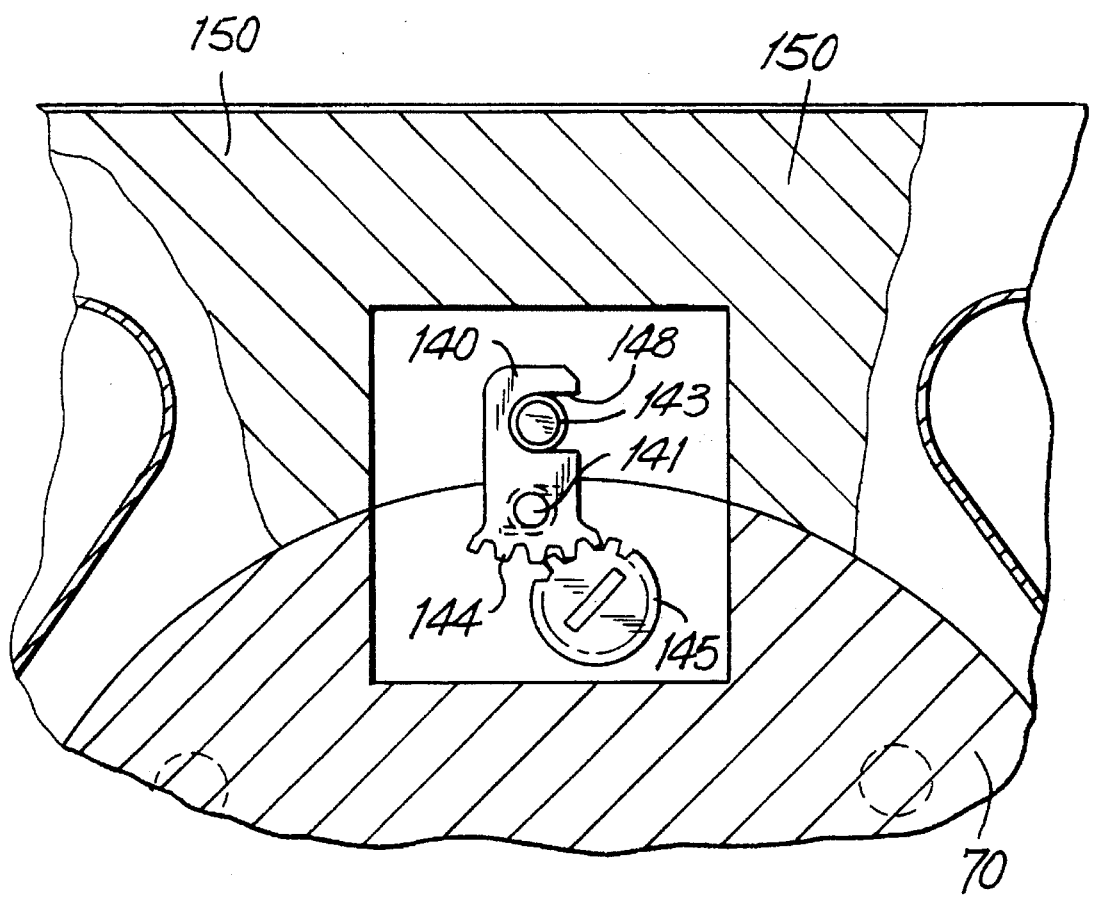
FIG. 15 is a view similar to a portion of FIG. 5 showing still another alternative embodiment of the invention.

FIG. 15 shows an alternative technique for securing a shroud or a member like member 70 to a stator in any of the embodiments discussed above which involve the use of such shrouds or members 70. As shown in FIG. 15, member 70 carries a latch 140 which is pivotally mounted on pin 141. A spring (shown in dotted lines) around pin 141 resiliently biases latch 140 to rotate in the clockwise direction about pin 141. One end of latch 140 is a sector gear which meshes with gear 145, also rotatably mounted in or on member 70. The other end of latch 140 includes a notch 142 for releasably receiving a pin 143 which extends axially from the end of the stator core. Terminal board 150 includes a recess around pin 143 for allowing latch 140 to gain access to the pin. Elements 140, 141, and 145 may also be disposed in a recess in element 70.

To place member 70 on the stator, gear 145 is rotated so that no substantial portion of latch 140 projects radially beyond the convex surface of member 70 which mates with the concave inner surface of the stator pole with which the member 70 is to be associated. The member 70 is then inserted into the stator parallel to the longitudinal axis of the stator so that the above-mentioned convex and concave surfaces mate with one another. Gear 145 is then released so that the spring around pin 141 causes latch 140 to rotate in the clockwise direction and engage pin 143, thereby latching member 70 to the stator.

After the coil has been wound and fused as described above in connection with other embodiments, member 70 can be removed from the stator by rotating gear 145 to pivot latch 140 counterclockwise out of engagement with pin 143. Member 70 can then be withdrawn axially from the stator.

As compared to other embodiments such as the one shown in FIGS. 9, 9a, and 10, the embodiment shown in FIG. 15 has the advantage that it does not require member 70 to be moved radially relative to the stator to mount member 70 on the stator or to subsequently remove member 70 from the stator.

It will be understood that the foregoing is merely illustrative of the principles of the invention, and that various modifications can be made by those skilled in the art without departing from the scope and spirit of the invention. For example, although several techniques have been described for positioning shrouds and members 70 relative to a stator, securing such elements to a stator, and later removing those elements from the stator, it will be understood that any of several other generally similar techniques can be employed if desired.

The invention claimed is:

1. Apparatus for facilitating the winding of a coil of wire on a pole of a stator, said pole having a predetermined width transverse to the longitudinal axis of the stator and adjacent the radially innermost portion of said pole such that said pole can support only up to a predetermined number of turns of wire wound on said pole, said coil having substantially more than said predetermined number of turns of wire after said coil has been wound and fused, said apparatus comprising:

first temporary support means distinct from said pole for temporarily increasing the width of said pole while said coil is being wound and supporting more turns of wire in said coil while said coil is being wound than said predetermined number of turns of wire; and second means for winding said coil on said pole while said width of said pole is increased by said first temporary support means, so that after said coil has been wound and fused said coil has substantially more than said predetermined number of turns of wire, wherein said first temporary support means is adjacent to said pole when said first temporary support means effectively increases said width of said pole.

2. The apparatus defined in claim 1 further comprising:

third means for applying said members to said stator prior to operation of said second means; and fourth means for removing said members from said stator after operation of said second means.

3. The apparatus defined in claim 2 further comprising:

fifth means for fusing the turns of said coil together after operation of said second means and prior to operation of said fourth means.

4. The apparatus defined in claim 3 wherein said wire has thermally fusable insulation and wherein said fifth means comprises:

means for heating said wire to a temperature sufficient to cause said insulation on adjacent turns of said wire in said coil to fuse together.

5. The apparatus defined in claim 4 wherein said means for heating comprises:

means for passing an electrical current through said wire to heat said wire.

6. The apparatus defined in claim 2 wherein said members are portions of a liner structure which is adapted to fit adjacent the radially innermost portion of said pole.

7. The apparatus defined in claim 6 wherein said liner structure comprises:

means for releasably latching said liner structure to said stator.

8. The apparatus defined in claim 6 wherein said liner structure includes wire guide portions for guiding wire from said second means into coilholders projecting axially from the axial ends of the stator.

9. The apparatus defined in claim 6 wherein said liner structure includes spacer members for spacing the axial end portions of the coil from the axial ends of the stator.

10. The apparatus defined in claim 6 wherein said liner structure includes coilholder members for supporting the axial end portions of the coil.

* * * * *